July 23, 1963    C. W. GREGORY    3,098,656
VEHICLE FRAME ASSEMBLY
Filed Oct. 7, 1960
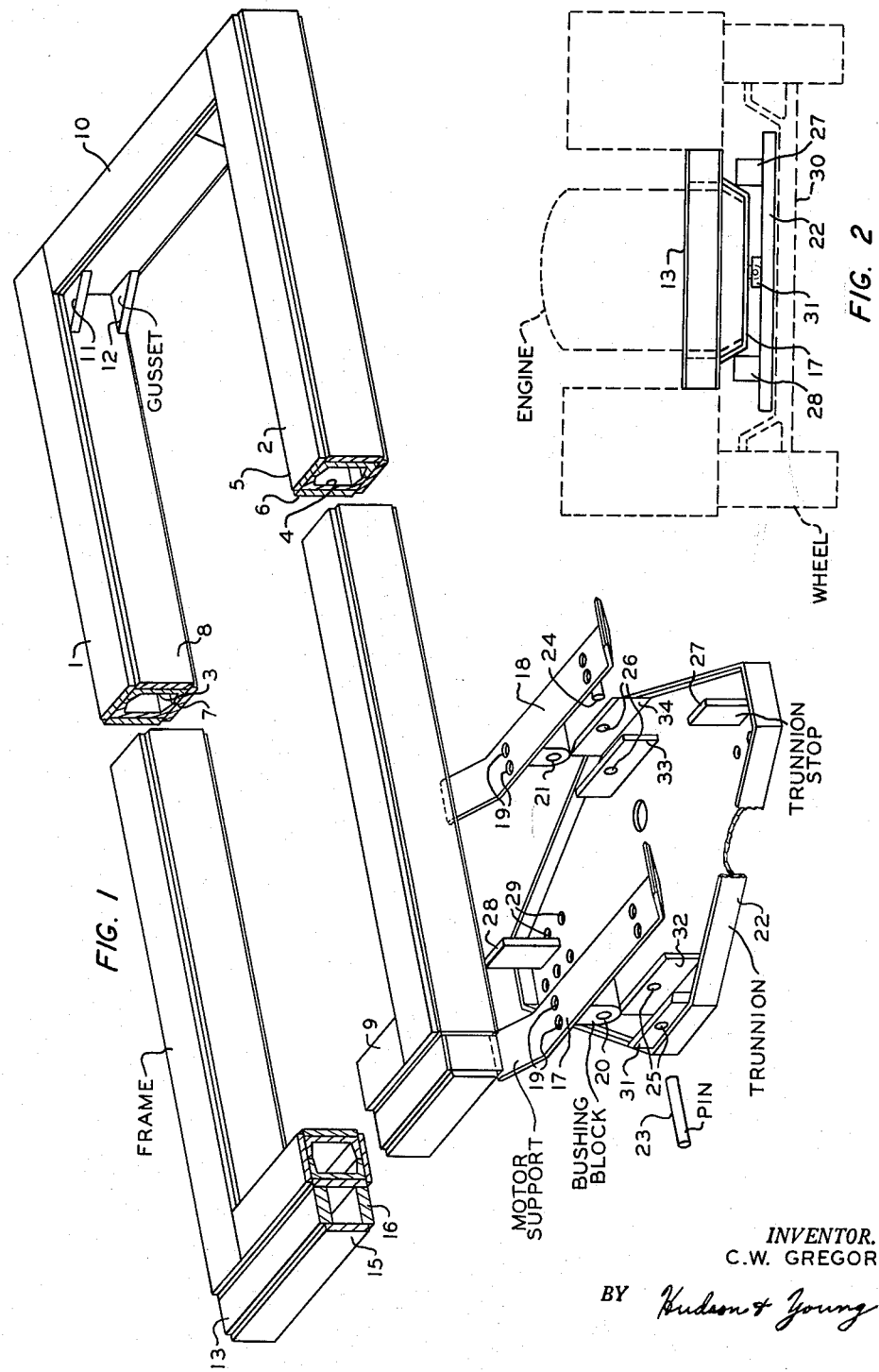
INVENTOR.
C.W. GREGORY
BY Hudson & Young
ATTORNEYS

United States Patent Office 3,098,656
Patented July 23, 1963

3,098,656
VEHICLE FRAME ASSEMBLY
Charles W. Gregory, Grants, N. Mex., assignor to Phillips Petroleum Company, a corporation of Delaware
Filed Oct. 7, 1960, Ser. No. 61,157
2 Claims. (Cl. 280—106)

This invention relates to an improved vehicle frame assembly. In one specific aspect, this invention relates to an improved vehicle frame. In another specific aspect, this invention relates to an improved vehicle frame, trunnion and motor supports to be employed in a vehicle used to transport heavy loads.

The frames of vehicles of conventional design employed to transport heavy loads have been twisted, resulting in failure of the chassis frame, when said vehicles are operated over uneven ground. This is particularly relevant in the case of ore carriers employed in mines.

Accordingly, an object of this invention is to provide an improved vehicle frame. Another object of this invention is to provide an improved frame for vehicles employed in transporting heavy loads.

Another object of this invention is to provide an improved vehicle frame, trunnion and motor supports for an ore carrier.

FIGURE 1 is a perspective view of one form of the improved frame, trunnion and motor supports with parts thereof broken away to more clearly illustrate the formation of component parts.

FIGURE 2 is a front elevation of the improved frame, trunnion and motor supports in their respective relationship to other component parts of a conventional load-carrying vehicle.

Referring to FIGURE 1, the numerals 1 and 2 designate a pair of box-shaped side rails of a vehicle frame. These side rails are formed in each case by two inwardly-facing abutting channels 3 and 4 held in fixed relationship to each other by welding or other suitable means. Surrounding said channels 3 and 4 are plate reinforcing members 5, 6, 7 and 8, said reinforcing members held in fixed relationship to each other and to channels 3 and 4 by welds, rivets or other suitable means.

The forward ends of the side rails are connected by means of a box-shaped cross member 9 formed as in the case of side rails 1 and 2. In like manner, the rearward ends of side rails 1 and 2 are connected by a box-shaped cross member 10 formed in the same manner as side rails 1 and 2. Preferably, but not necessarily, gusset plates 11 and 12 are placed so as to provide additional bracing between the respective upper and lower portions of side rail 1 and cross member 10. In like manner, additional bracing is provided between side rail 2 and cross member 10.

Extending across the entire forward width of the frame and directly attached to the frame is a bumper or force-resisting member. The bumper is preferably fabricated of plate members 13 and 16 welded to plate 15 and cross member 9. Preferably, but not necessarily, plate 15 is of lighter gauge material than plates 13 and 16.

As illustrated in FIGURES 1 and 2, motor supports 17 and 18 are secured to and suspended from the lower inner portion of side rails 1 and 2. Preferably, but not necessarily limited thereto, motor supports 17 and 18 are welded to side rails 1 and 2 at that portion of said side rails where reinforcing members 7 and 8 are joined and where reinforcing members 6 and 7 are joined. Said motor supports 17 and 18 are provided with apertures 19, said apertures providing a means whereby a motor can be bolted to motor supports 17 and 18. Suspended from the center portion of each of said motor supports 17 and 18, and in fixed relationship to each of said motor supports, are bushing blocks 20 and 21, respectively. Bushing blocks 20 and 21 support a trunnion 22 by means of a pin 23 inserted through apertures 25, and bushing block 20 and a pin 24 inserted through apertures 26 and bushing block 21, respectively.

Trunnion 22 is a substantially diamond-shaped plate member with plate edging extending above and below said diamond-shaped plate member and perpendicular to said diamond-shaped plate member. Extending upward from and perpendicular to said diamond-shaped plate member are support members 31, 32, 33, and 34, said support members welded to or otherwise secured to said diamond-shaped plate member and spaced so as to be positioned adjacent to the forward and rearward open faces of bushing blocks 20 and 21. Trunnion 22 pivots about bushing blocks 20 and 21, the degree of pivoting restricted by trunnion stops 27 and 28 coming in contact with side rails 1 and 2. Trunnion 22 is provided with a plurality of apertures 29, said apertures providing the means whereby an axle may be bolted to the underneath side of said trunnion 22.

FIGURE 2 illustrates a frame, motor support, and trunnion in their respective relationship to the component parts of a conventional load-carrying vehicle. The axle 30 is bolted to the trunnion 22 and held in fixed relationship to trunnion 22 with the aid of shims.

It is, of course, within the scope of this invention to employ other motor support means and wheel assembly means with the inventive frame herein illustrated.

As will be evident to those skilled in the art, various modifications of this invention can be made, or followed, in the light of the foregoing disclosure and discussion without departing from the spirit or scope thereof.

I claim:
1. A heavy load bearing vehicle frame assembly comprising two spaced box-shaped side rails of hollow cross section, transversely box-shaped cross rails of hollow cross section interconnecting said side rails at points adjacent their respective forward and rearward ends, each of said side rails and each of said cross rails comprising inwardly facing abutting channels in fixed relationship to each other, a reinforcing plate member adjacent to and in fixed relationship to each outer surface of said abutting channels, said reinforcing plate members surrounding said inwardly facing abutting channels, first and second spaced cross members forwardly secured to said side rails, said spaced cross members substantially disposed in a horizontal plane beneath said side rails with that portion of each of said cross members secured to said side rails extending outwardly and upwardly from the horizontally disposed portion of each of said cross members, a force-resisting member parallel to and secured to said forward cross rail, said force-resisting member extending beyond said forward cross rail and in front of the ends of said side rails, and a trunnion plate member supported by said cross mem- bers and restrictively pivoted about the center of each of said first and second spaced cross members.

2. The heavy load bearing vehicle frame assembly of claim 1 to include brace members interposed between each of said side rails and said rearward box-shaped transverse cross rail.

References Cited in the file of this patent

UNITED STATES PATENTS

| | | |
|---|---|---|
| 924,941 | Schmidt | June 15, 1909 |
| 1,723,518 | Murray | Aug. 6, 1929 |
| 2,002,823 | Marvel | May 28, 1935 |
| 2,027,898 | Broulhiet | Jan. 14, 1936 |
| 2,174,922 | Kuiper | Oct. 3, 1939 |
| 2,507,845 | Ziegler | May 16, 1950 |
| 2,736,569 | Davis | Feb. 28, 1956 |
| 2,880,013 | Dean | Mar. 31, 1959 |

FOREIGN PATENTS

| | | |
|---|---|---|
| 113,024 | Australia | May 2, 1941 |
| 151,352 | Great Britain | Sept. 21, 1920 |
| 196,819 | Austria | Mar. 25, 1958 |
| 564,532 | Italy | June 19, 1957 |
| 957,625 | Germany | Feb. 7, 1957 |